United States Patent
Yamamoto et al.

(10) Patent No.: US 11,511,685 B2
(45) Date of Patent: Nov. 29, 2022

(54) WIRE HARNESS ROUTING DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 357 days.

(21) Appl. No.: 16/631,230

(22) PCT Filed: Jul. 10, 2018

(86) PCT No.: PCT/JP2018/025963
§ 371 (c)(1),
(2) Date: Jan. 15, 2020

(87) PCT Pub. No.: WO2019/017235
PCT Pub. Date: Jan. 24, 2019

(65) Prior Publication Data
US 2020/0215998 A1 Jul. 9, 2020

(30) Foreign Application Priority Data
Jul. 20, 2017 (JP) .............................. JP2017-140674

(51) Int. Cl.
*B60R 16/02* (2006.01)
*B60N 2/06* (2006.01)

(52) U.S. Cl.
CPC ............ *B60R 16/0215* (2013.01); *B60N 2/06* (2013.01)

(58) Field of Classification Search
CPC ......... B60N 2/06; B60R 16/0215; H05K 1/00
(Continued)

(56) References Cited

U.S. PATENT DOCUMENTS 4,905,413 A * 3/1990 Kuki ..................... E05F 15/689
49/362
9,944,238 B2 * 4/2018 Ma ...................... B60R 16/0215
(Continued)

FOREIGN PATENT DOCUMENTS

JP 2012-139064 A 7/2012
JP 2013-049402 A 3/2013

OTHER PUBLICATIONS

International Search Report dated Oct. 2, 2018 for WO 2019/017235 A1.

*Primary Examiner* — D Glenn Dayoan
*Assistant Examiner* — Sunsurraye Westbrook
(74) *Attorney, Agent, or Firm* — Venjuris, P.C.

(57) ABSTRACT

A wire harness routing device includes a rail in which an insertion hole is formed, a slider that is inserted into the insertion hole and that slides with respect to the rail, and a wire harness that is routed in the insertion hole and moves in accordance with sliding of the slider, and an excess length portion of the wire harness that is generated in accordance with movement of the wire harness deforms in the insertion hole and is held in a state in which it is accommodated in the insertion hole.

6 Claims, 17 Drawing Sheets

(58) Field of Classification Search
USPC ....... 296/193.01; 439/34, 76.2; 49/362, 348, 49/375
See application file for complete search history.

(56) References Cited

U.S. PATENT DOCUMENTS

| | | | |
|---|---|---|---|
| 10,315,593 B2 * | 6/2019 | Nishi | ................. B60R 16/0215 |
| 2006/0030174 A1 | 2/2006 | Tsubaki et al. | |
| 2007/0243729 A1 | 10/2007 | Tsubaki et al. | |

* cited by examiner

WIRE HARNESS ROUTING DEVICE

CROSS REFERENCE TO RELATED APPLICATIONS

This application is a national phase of PCT application No. PCT/JP2018/025963, filed on 10 Jul. 2018, which claims priority from Japanese patent application No. 2017-140674, filed on 20 Jul. 2017, all of which are incorporated herein by reference.

TECHNICAL FIELD

The present specification discloses a technique related to a wire harness.

BACKGROUND

Conventionally, vehicles such as automobiles are provided with slidable seats, some of which are provided with electric components such as electric reclining devices, seat heaters, and the like. Wire harnesses, which connect these electronic components to devices and the like on the vehicle body side, move in accordance with sliding of the seats between the seats and the vehicle body, and thus a configuration for absorbing an excess length of a wire harness is provided between the seats and the vehicle body. In Patent Document 1, a seat leg portion and a wire harness covered with a protector are slidably accommodated in a lateral space formed by partitioning a space in a seat rail below the seat. An excess length absorption box is arranged at a position adjacent to the side of the seat rail, and when the seat leg portion is slid, the excess length portion of the wire harness is folded into a U-shape and accommodated in the excess length absorption box.

PRIOR ART DOCUMENT

Patent Document

Patent Document 1: JP 2013-049402 A

SUMMARY OF THE INVENTION

Problems to be Solved

Incidentally, in the configuration disclosed in Patent Document 1, the excess length absorption box is necessary to absorb the excess length of the wire harness, but there is a problem in that an available space in the vehicle is reduced by the space taken up by the excess length absorption box.

A technique disclosed in the present specification has been made in view of the circumstances as described above, and an object thereof is to simplify the configuration for absorbing an excess length of a wire harness.

Means to Solve the Problem

A wire harness routing device disclosed in the present specification includes: a rail in which an insertion hole is formed; a slider that is inserted into the insertion hole and that slides with respect to the rail; and a wire harness that is routed in the insertion hole and moves in accordance with sliding of the slider, and an excess length portion of the wire harness that is generated in accordance with movement of the wire harness deforms in the insertion hole and is held in a state in which it is accommodated in the insertion hole.

With this configuration, even if an excess length absorption box is not provided outside of the rail, the excess length portion of the wire harness can be held in a state in which it is accommodated in the rail, and thus it is possible to simplify the configuration for absorbing the excess length of the wire harness.

The following modes are favorable as embodiments of the technique disclosed in the present specification.

The wire harness may extend in the insertion hole such that portions thereof oppose each other, and the excess length portion may be folded back in the insertion hole.

With this configuration, it is possible to efficiently route the wire harness in the rail.

The wire harness may include a plurality of wires, and may be formed by arranging the plurality of wires side by side into a flat shape.

With this configuration, since the wire harness is flat, the wire harness can be easily folded back into a predetermined direction in the rail, and thus it is possible to route the excess length portion of the wire harness in a predetermined path.

A roller that applies tension to a portion of the wire harness that is folded back in the insertion hole may be provided.

With this configuration, it is possible to suppress the excess length portion of the wire harness from bending in the insertion hole.

The rail may include a harness routing groove in which the wire harness is routed.

With this configuration, it is possible to guide the wire harness along the routing path with use of the harness routing groove.

The rail may include a through-groove that allows communication of the insertion hole with the outside, the slider is provided with a slide insertion portion that can be slidably inserted into the through-groove, and the wire harness routing device further includes a cover for closing the through-groove, and a cover opening/closing mechanism that can switch the cover between a closed state in which the cover closes the through-groove and an open state in which the through-groove is open, in accordance with sliding of the slide insertion portion in the through-groove.

In configurations in which a wire harness is routed in the rail, there are risks that the wire harness will protrude from the through-groove, and foreign objects will intrude from the through-groove into the rail, which may be obstacles for routing the excess length portion of the wire harness. With the above-described configuration, since the through-groove of the rail is covered with the cover, it is possible to suppress the wire harness from protruding from the through-groove, and to suppress foreign objects from intruding into the rail from the through-groove. Here, there is a concern that the cover for covering the through-groove will be an obstacle for sliding of the slide insertion portion that can be inserted into the through-groove. However, with the above-described configuration, the cover opening/closing mechanism makes it possible to switch the cover between the closed state in which the cover closes the through-groove and the open state in which the through-groove is open, in accordance with sliding of the slide insertion portion in the through-groove, and thus it is possible to suppress the cover from being an obstacle for sliding of the slide insertion portion.

Effect of the Invention

According to the technique disclosed in the present specification, it is possible to simplify a configuration for absorbing an excess length portion of a wire harness.

DETAILED DESCRIPTION TO EXECUTE THE INVENTION

First Embodiment

Hereinafter, a first embodiment will be illustrated with reference to FIGS. 1 to 7.

A wire harness routing device 10 according to the present embodiment is arranged under a seat 60 (an example of a sliding object) in a vehicle such as an automobile to route a wire harness 50 in a rail 20, for example. Note that in the following description, the X direction in FIG. 1 denotes rightward, the Y direction denotes frontward, and the Z direction denotes upward.

Figure 1:
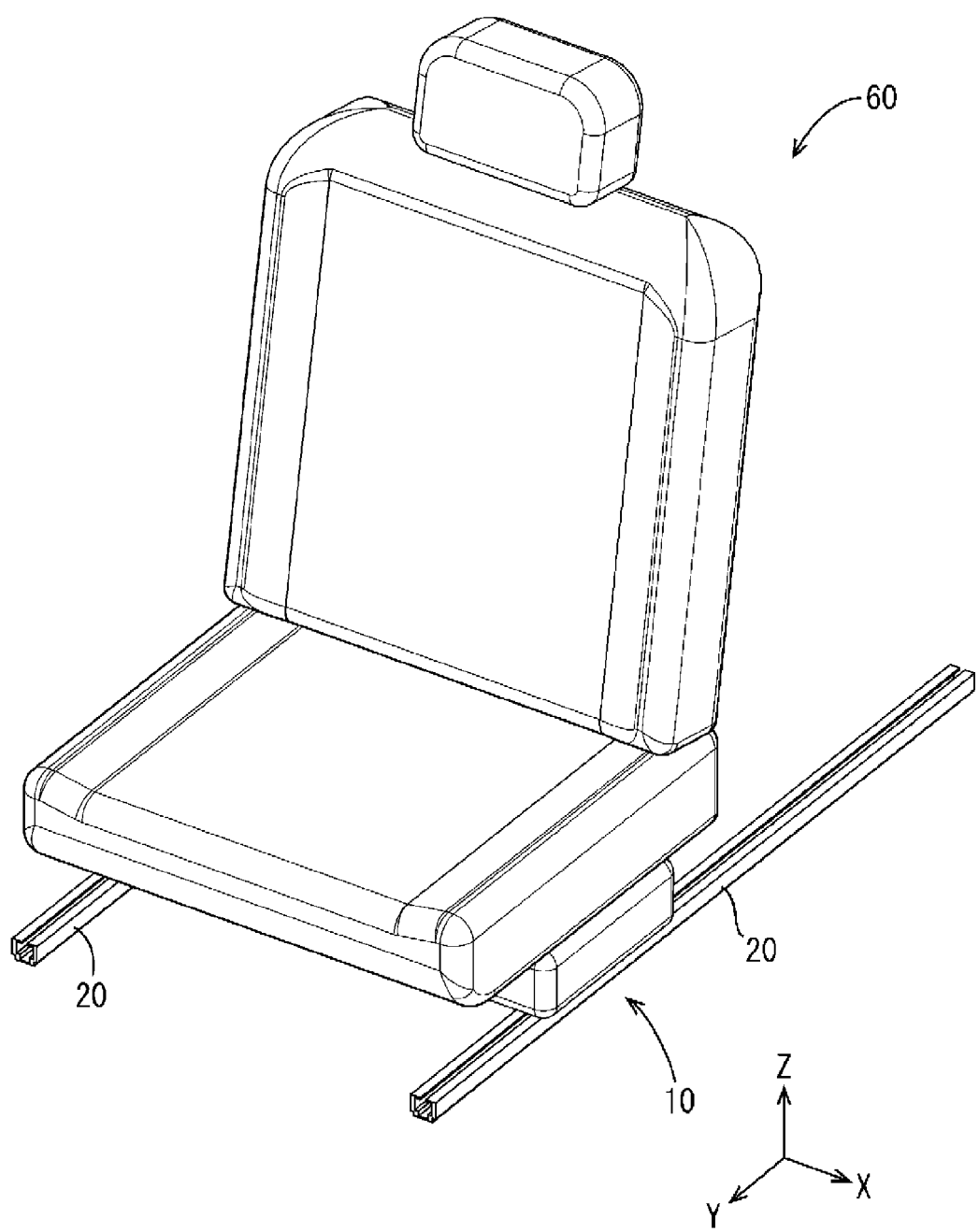
FIG. 1 is a perspective view showing a slidable seat including a wire harness routing device according to a first embodiment.

As shown in FIG. 1, the seat 60 is capable of sliding in a front-rear direction with respect to a pair of rails 20 fixed on a floor in a cabin of a vehicle body that is not shown. The seat 60 is provided with various types of electric components such as an electric reclining apparatus, a seat heater, a sensor for detecting whether a passenger is sitting on the seat, and a sensor for detecting whether a seat belt is fastened, for example.

(Wire Harness Routing Device 10)

Figure 7:
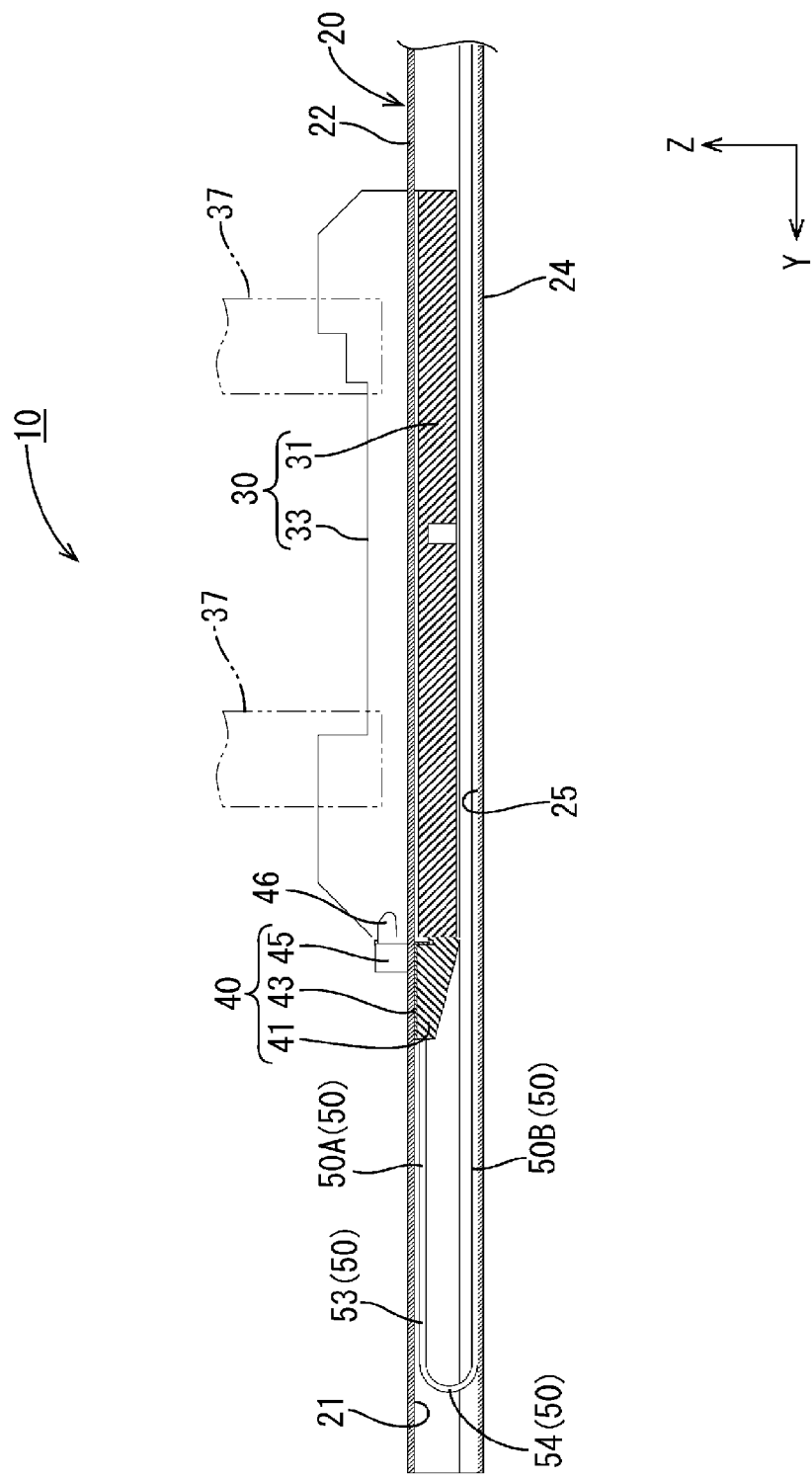
FIG. 7 is a cross-sectional view taken along line B-B in FIG. 6.
Figure 8:
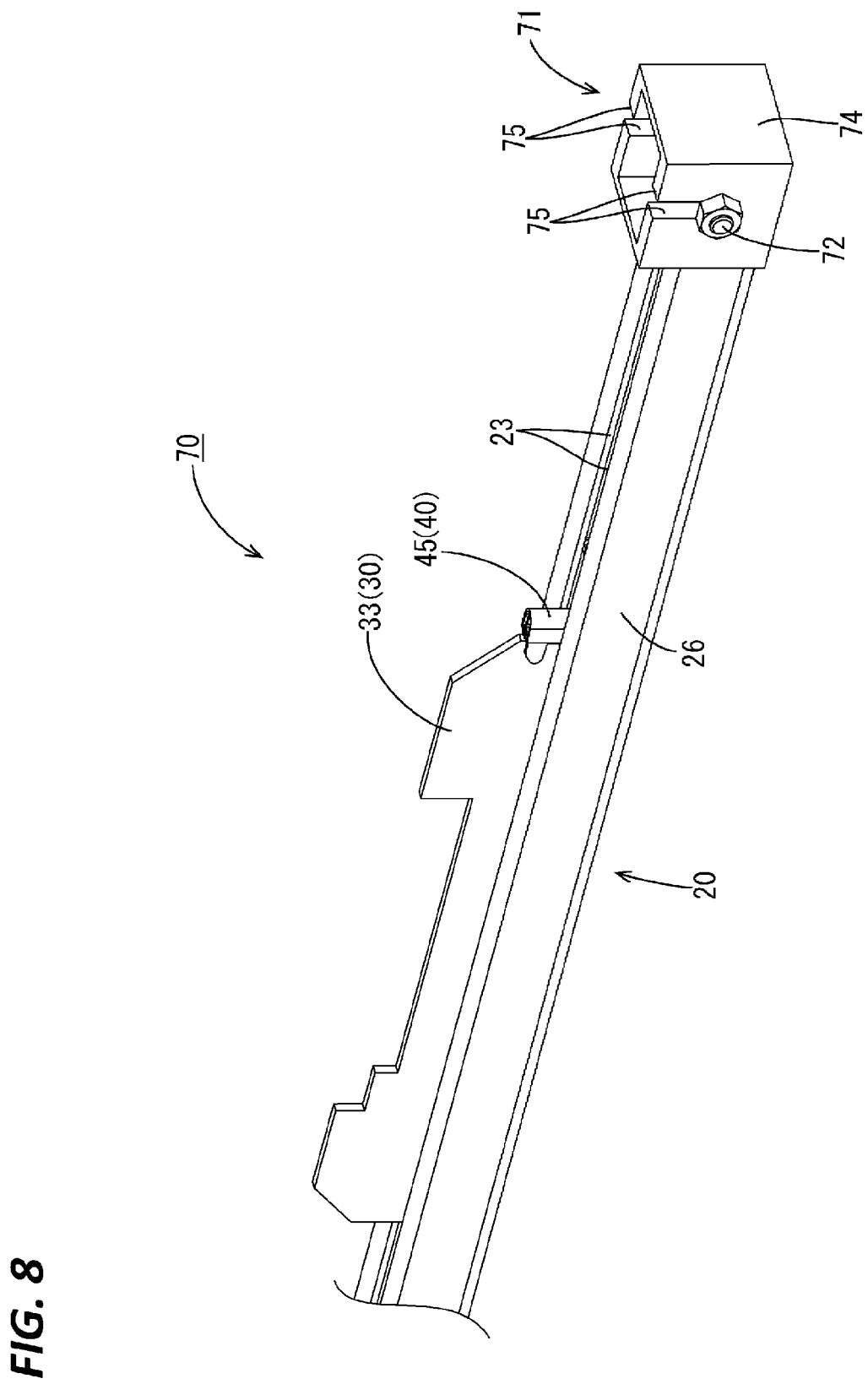
FIG. 8 is a perspective view showing a wire harness routing device according to a second embodiment.
Figure 9:
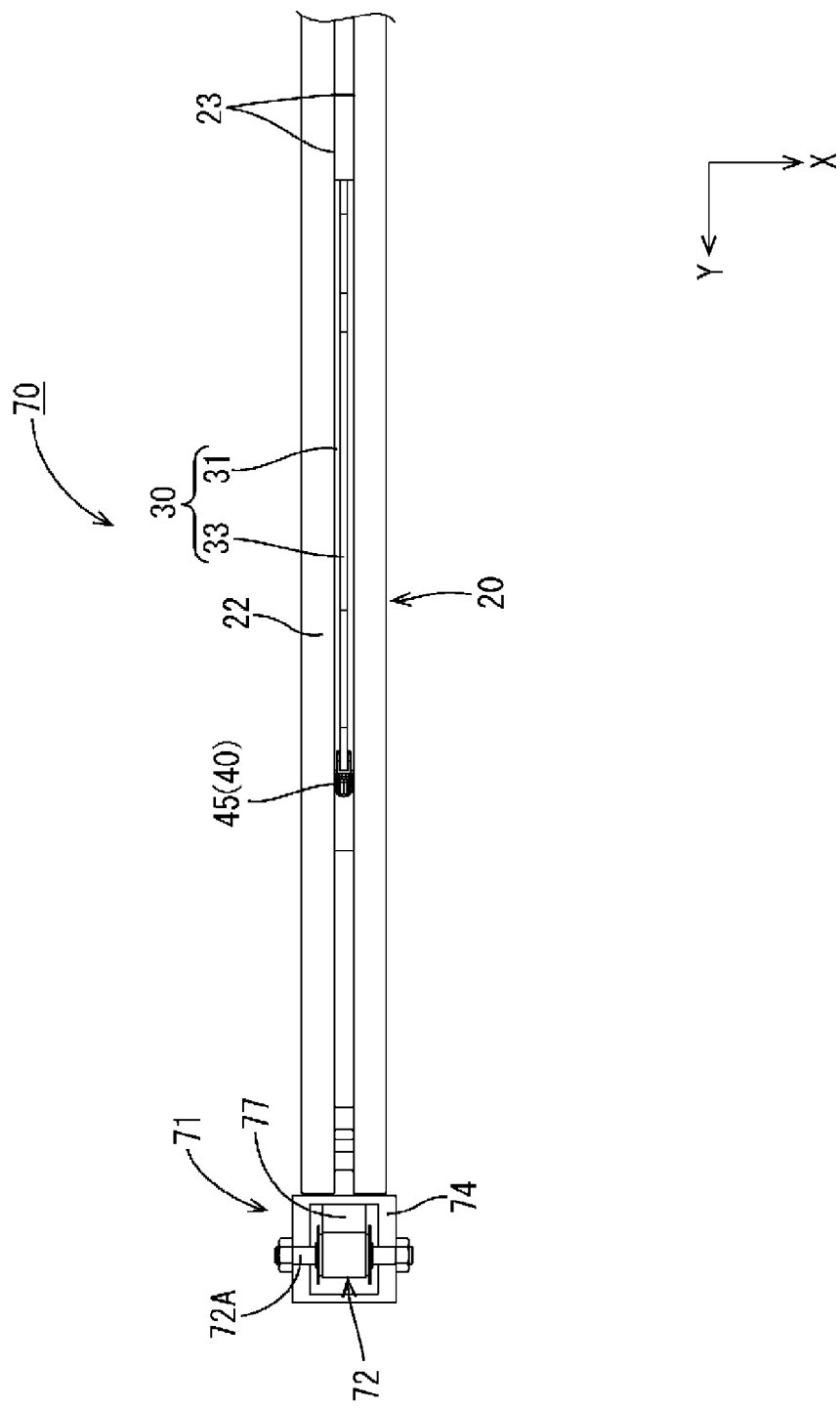
FIG. 9 is a plan view showing the wire harness routing device.
Figure 10:
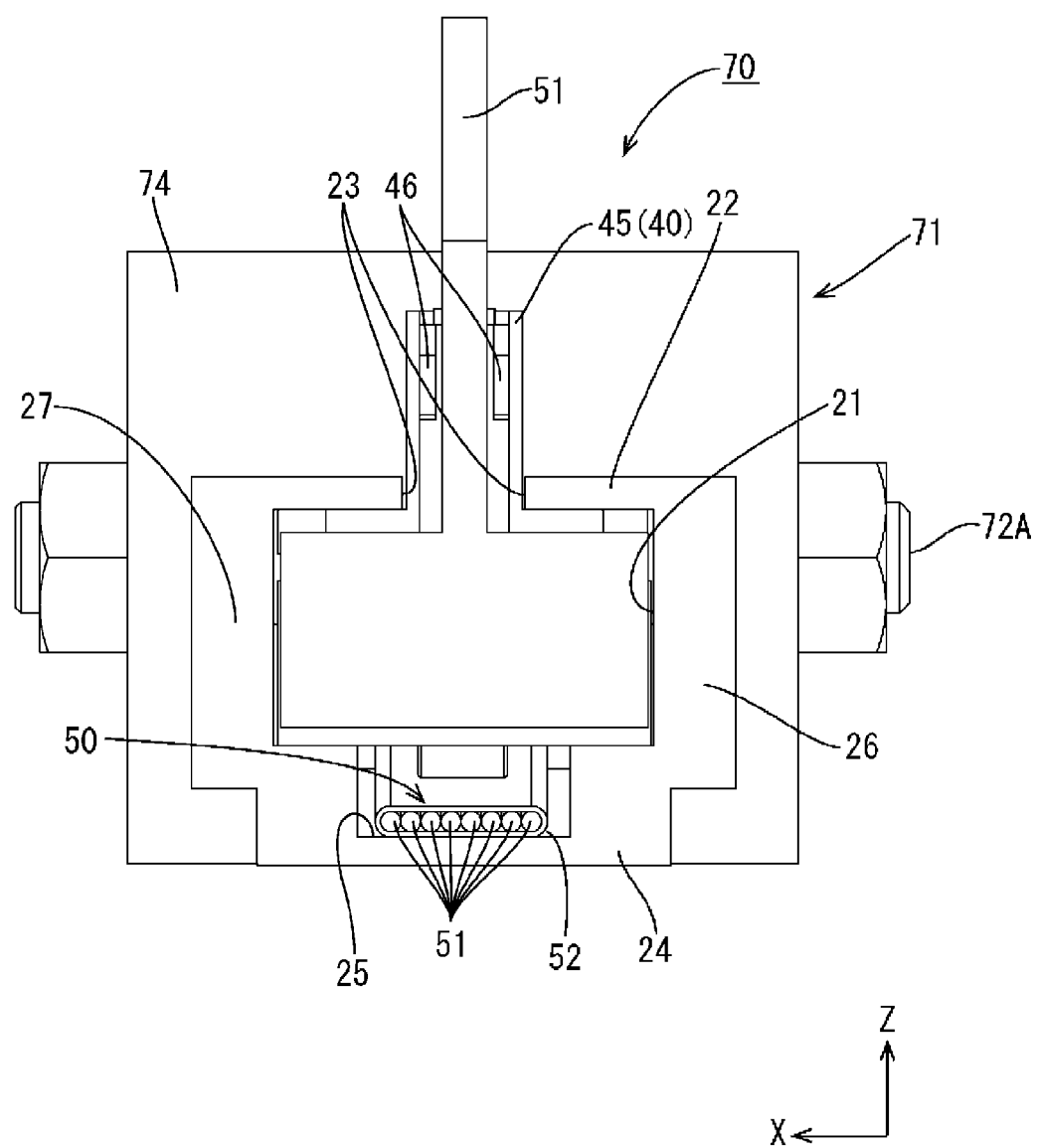
FIG. 10 is a back view showing the wire harness routing device.

As shown in FIG. 7, the wire harness routing device 10 is provided with the rail 20, a slider 30 that moves with respect to the rail 20 in accordance with sliding of the seat 60, and a wire harness 50 that moves in accordance with movement of the slider 30.

(Rail 20)

Figure 6:
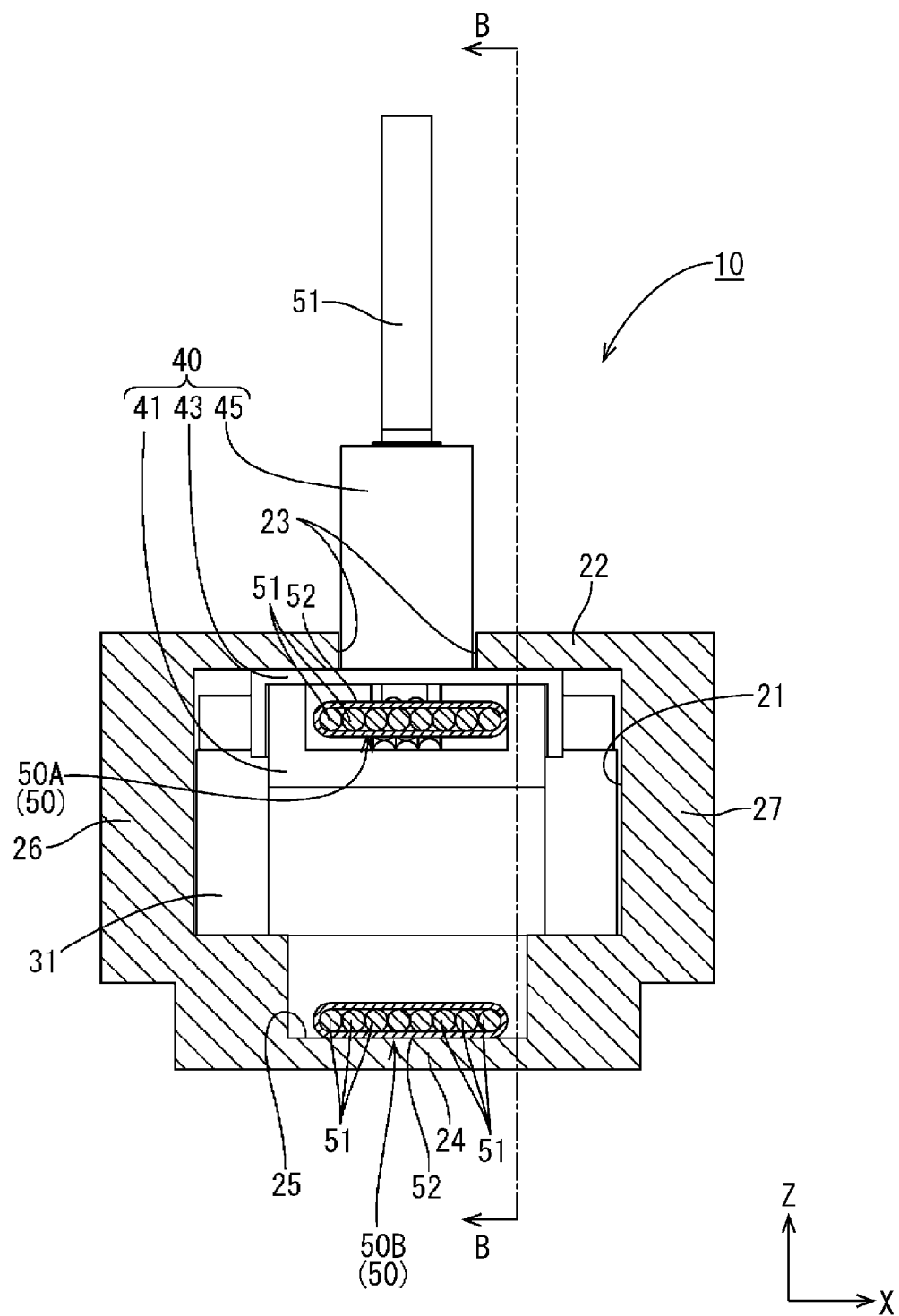
FIG. 6 is a cross-sectional view taken along line A-A in FIG. 3.

The rail 20 is made of metal such as steel or aluminum, and a pair of the rails 20 are provided on the floor for each seat 60. The rails 20 each linearly extend in the front-rear direction, and have an insertion hole 21 penetrating therethrough in the front-rear direction. As shown in FIG. 6, the rails 20 each include an upper wall 22 having a through-groove 23 extending in the front-rear direction, a lower wall 24 that opposes the upper wall 22, and a pair of side walls 26 and 27 that join a side edge of the upper wall 22 and a side edge of the lower wall 24, and the insertion hole 21 is formed by being surrounded by the upper wall 22, the lower wall 24, and the side walls 26 and 27. A slider body 31 can be fitted and slide in the insertion hole 21.

The through-groove 23 penetrates in a middle portion in the width direction of the upper wall 22, and extends over the entire length of the rail 20 in the front-rear direction. A groove-shaped harness routing groove 25 linearly extends in the front-rear direction over the entire length of the rail 20 on the upper side of the lower wall 24. The harness routing groove 25 guides the guiding direction of the wire harness 50. Note that although the slider 30 is not inserted into a space in the harness routing groove 25 in the present embodiment, the slider may also be partly inserted into the harness routing groove 25.

(Slider 30)

The slider 30 is made of a material such as synthetic resin or metal, and can be inserted into the rail 20 and slide in the rail 20, and as shown in FIG. 7, the slider 30 includes a slider body 31 that is inserted into the rail 20 and slides on the inner walls of the insertion hole 21, and a slide insertion portion 33 that protrudes upward from an upper end portion of the slider body 31 and can be inserted into the through-groove 23.

Figure 2:
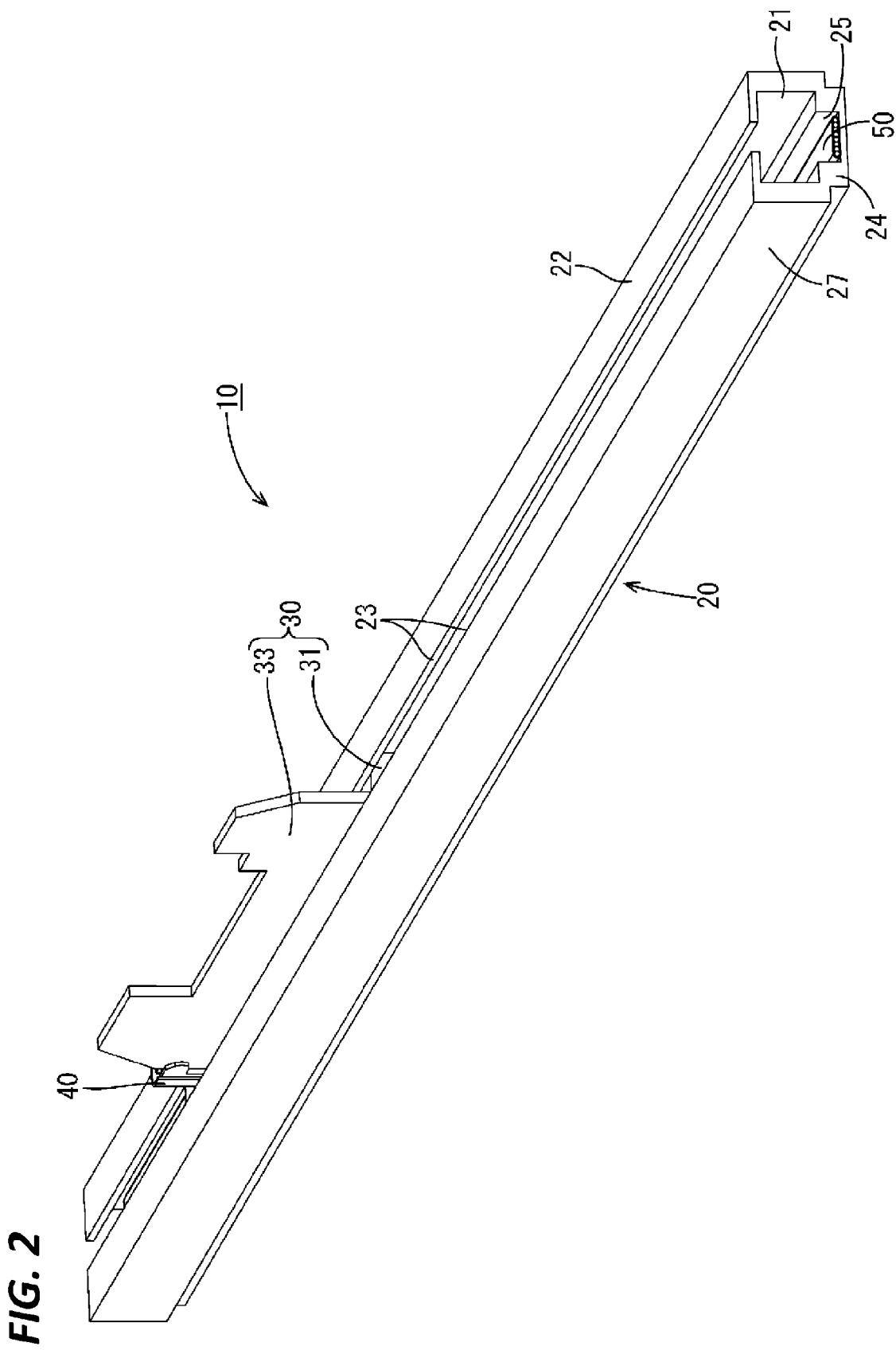
FIG. 2 is a perspective view showing the wire harness routing device.
Figure 3:
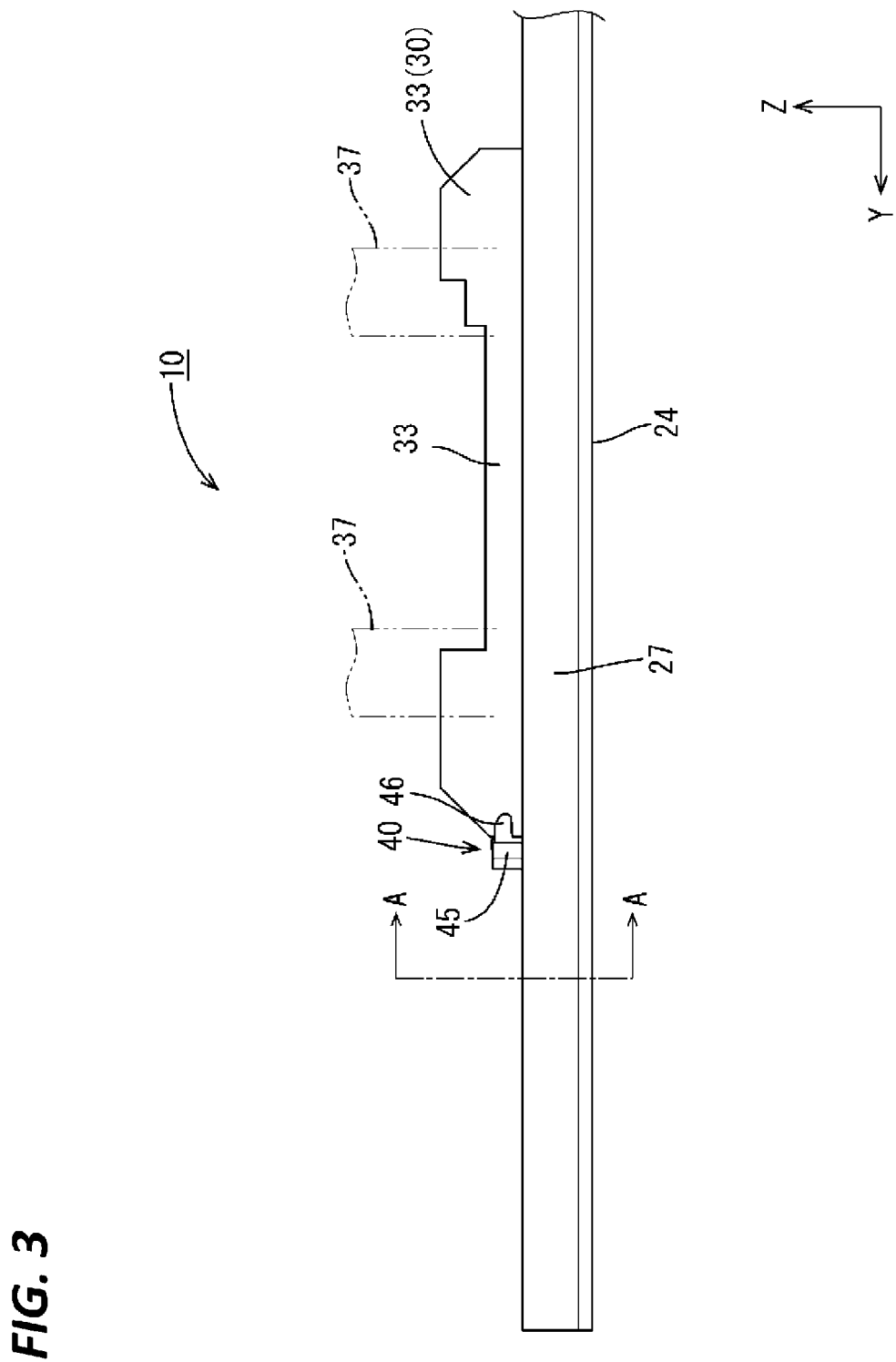
FIG. 3 is a side view showing the wire harness routing device.
Figure 4:
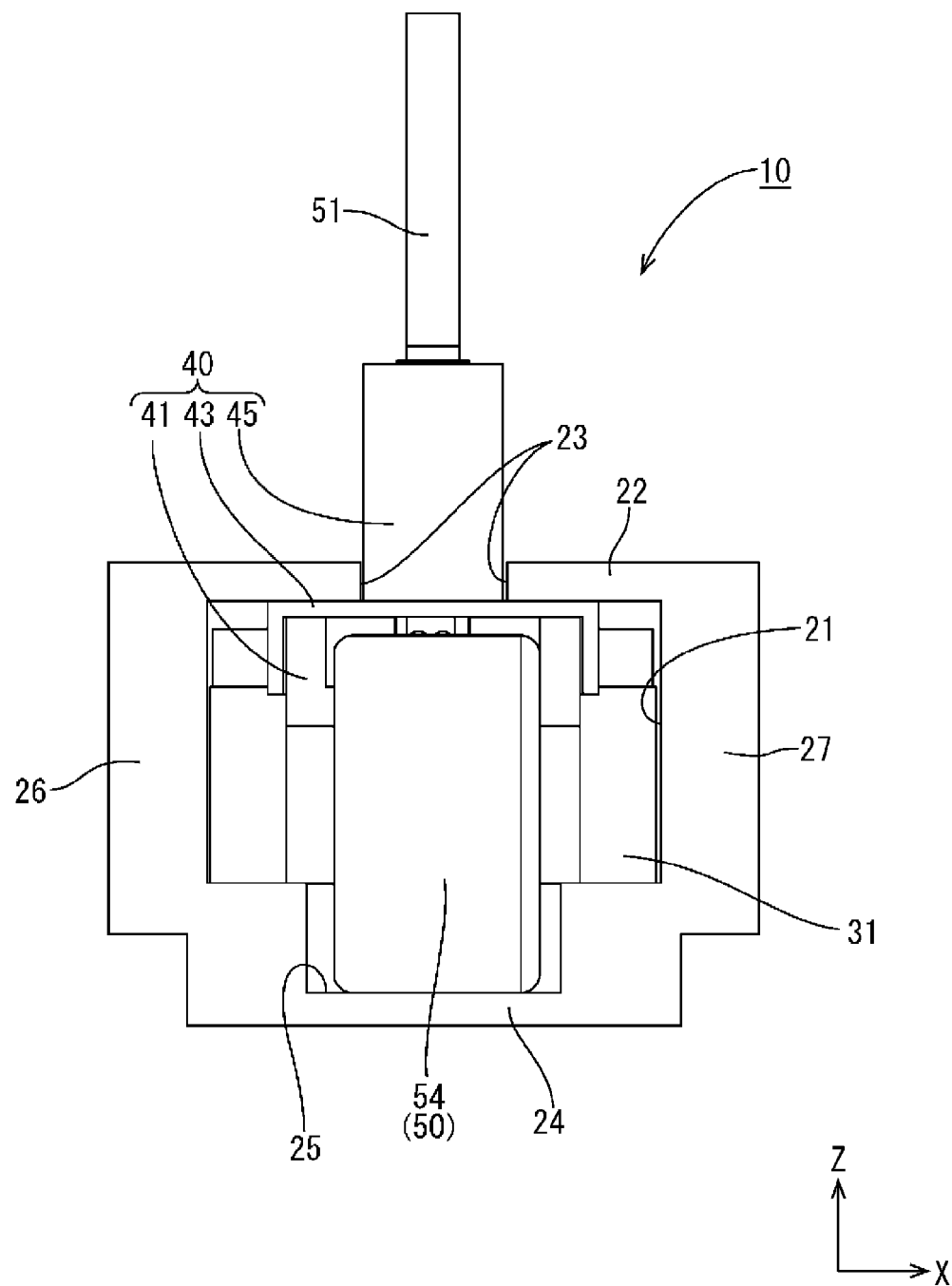
FIG. 4 is a front view showing the wire harness routing device.
Figure 5:
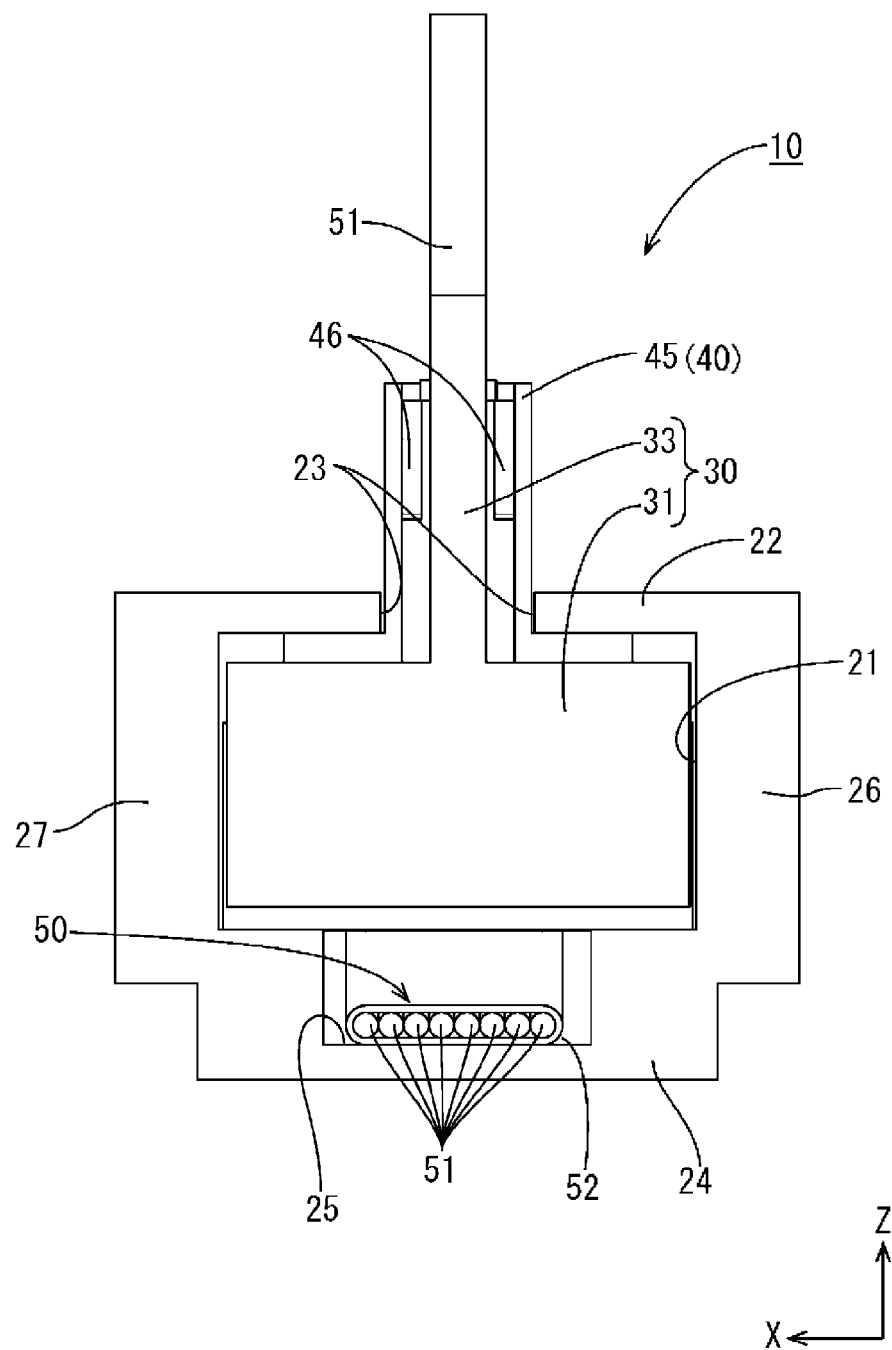
FIG. 5 is a back view showing the wire harness routing device.

The slider body 31 is shaped like a long cuboid extending in the front-rear direction (the direction in which the rail 20 extends), is inserted into the insertion hole 21 of the rail 20, and is capable of moving in the insertion hole 21 in the front-rear direction. The slide insertion portion 33 is shaped like a plate extending in the direction perpendicular to the upper surface of the slider body 31, and inserted into the through-groove 23 of the rail 20 so as to be slidable as shown in FIG. 2. The slide insertion portion 33 is fixed on an attachment member 37 (see FIG. 3) with a bolt, for example, and can be fixed underneath the seat 60 via the attachment member 37. The slide insertion portion 33 slides above the through-groove 23, and in a cutout portion formed on a mat or the like on the floor. A protector 40 into which the wire harness 50 can be inserted is fixed to the front end portion of the slider body 31.

(Protector 40)

As shown in FIGS. 6 and 7, the protector 40 includes a triangular harness mounting portion 41 on which the wire harness 50 can be arranged, a lid portion 43 for covering the harness mounting portion 41, and an angular tube-shaped tubular portion 45. The lower side of the harness mounting portion 41 is cut out such that the thickness dimension on the leading end side is smaller, and a mounting recess 42 on which the wire harness 50 can be mounted is formed on the upper surface of the harness mounting portion 41. The mounting recess 42 is formed deeper than the thickness of the wire harness 50 in the vertical direction. The tubular portion 45 is provided with a pair of plate-shaped pinching portions 46 that are arranged so as to pinch the front end portion of the slide insertion portion 33. By the wire harness 50 being inserted into the protector 40, the direction in which the wire harness 50 extends is shifted to the perpendicular direction and is the wire harness 50 is led toward the seat 60.

(Wire Harness 50)

The wire harness 50 is formed by a plurality (in the present embodiment, 8) of wires 51 arranged in a close contact with each other in the left-right direction. The wire harness 50 is flat (having a shape in which the dimension in the left-right direction is greater and the thickness in the vertical direction is smaller) and is formed by a sheath 52 collectively covering all the wires 51. Coated wires in which conductive portions of stranded wires formed by twisting metal element wires or single-core wires are coated by insulating layers can be used for the wires 51. In the wire harness 50, the sheath 52 on the tubular portion 45 side of the harness mounting portion 41 is removed and the plurality of wires 51 are exposed. These wires 51 are bundled together and inserted into the tubular portion 45. The wires 51 led out toward the seat 60 are electrically connected to various electrical components of the seat 60. The other end (on the rear side) of the wire harness 50 is connected to devices such as an ECU (Electric Control Unit) via the wire harness 50 routed on the floor (underneath the mat, a panel, or the like) of the vehicle body and under the floor.

The wire harness 50 inserted into the insertion hole 21 of the rail 20 extends along the lower surface of the upper wall 22 and the upper surface of the harness routing groove 25 of the lower wall 24, and the front end portion of the wire harness 50 forms a folded portion 54 that is folded back. When the seat 60 slides in the front-rear direction, the wire harness 50A extending along the upper wall 22 of the rail 20 moves in the front-rear direction with the folded portion 54, along with the seat 60. However, the wire harness 50B extending along the lower wall 24 of the rail 20 does not move in the front-rear direction. An excess length portion 53, which is an excess portion of the wire harness 50 in its length, is generated depending on the direction in which the seat 60 slides. The length of the excess length portion 53 varies depending on the sliding of the seat 60, and changes the position, in the front-rear direction, of the folded portion 54.

Next, the operation of the wire harness routing device 10 will be illustrated.

When the seat 60 is slid frontward, the slider 30 slides forward in accordance with the seat 60, the wire harness 50 deforms, and the folded portion 54 moves forward, and the excess length portion 53 of the wire harness 50A extending along the upper wall 22 becomes shorter (see FIG. 7). On the other hand, when the seat 60 is slid rearward, the slider 30 slides rearward in accordance with the seat 60, the wire harness 50 deforms, and the folded portion 54 moves rearward, and thus the excess length portion 53 of the wire harness 50A extending along the upper wall 22 becomes longer.

Next, actions and effects of the present embodiment will be illustrated.

The wire harness routing device 10 is provided with the rail 20 in which the insertion hole 21 is formed, the slider 30 that is inserted into the insertion hole 21 and slides with respect to the rail 20, and the wire harness 50 that is routed in the insertion hole 21 and moves in accordance with sliding of the slider 30, and the excess length portion 53 of the wire harness 50 that is generated due to movement of the wire harness 50 deforms in the insertion hole 21 and is held in a state in which it is accommodated in the insertion hole 21.

According to the present embodiment, since it is possible to hold the excess length portion 53 of the wire harness 50 in a state in which it is accommodated in the rail 20 without providing an excess length absorption box outside of the rail 20, the configuration for absorbing the excess length of the wire harness 50 can be simplified.

Furthermore, the wire harness 50 extends such that portions thereof oppose each other in the insertion hole 21, and the excess length portion 53 is folded back in the insertion hole 21.

In this manner, it is possible to efficiently route the wire harness 50 in the rail 20.

Furthermore, the wire harness 50 includes the plurality of wires 51 and is formed by arranging the wires 51 side by side in a flat shape.

In this manner, by forming the wire harness 50 into a flat shape, the wire harness 50 can be folded back in a predetermined direction in the rail 20, and thus the excess length portion 53 of the wire harness 50 can be readily routed along a predetermined path.

In addition, the rail 20 includes the harness routing groove 25 in which the wire harness 50 is routed.

In this manner, it is possible to guide the wire harness 50 along the routing path with use of the harness routing groove 25.

Second Embodiment

Hereinafter, a second embodiment will be illustrated with reference to FIGS. 8 to 12.

Figure 11:
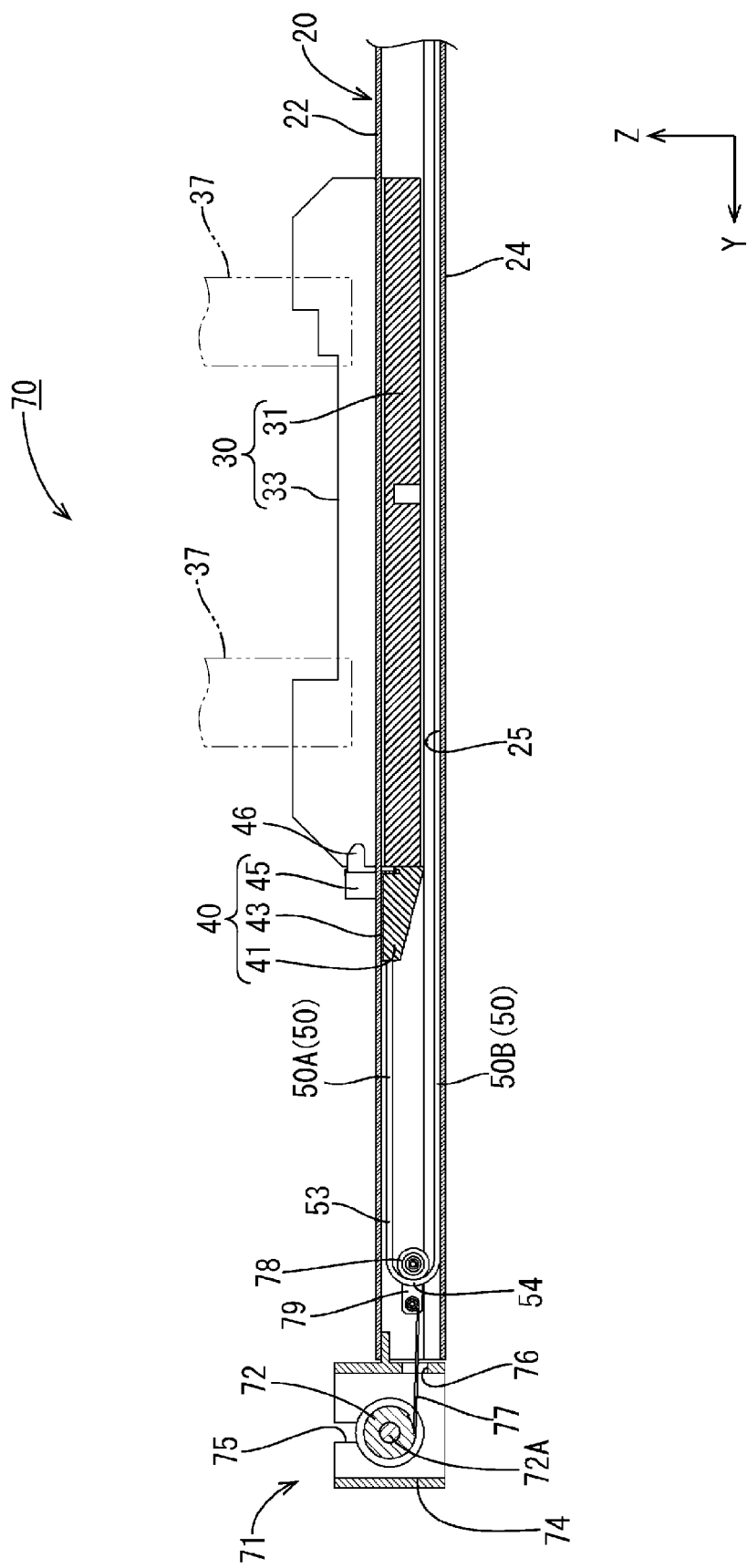
FIG. 11 is a vertical cross-sectional view showing the wire harness routing device.
Figure 12:
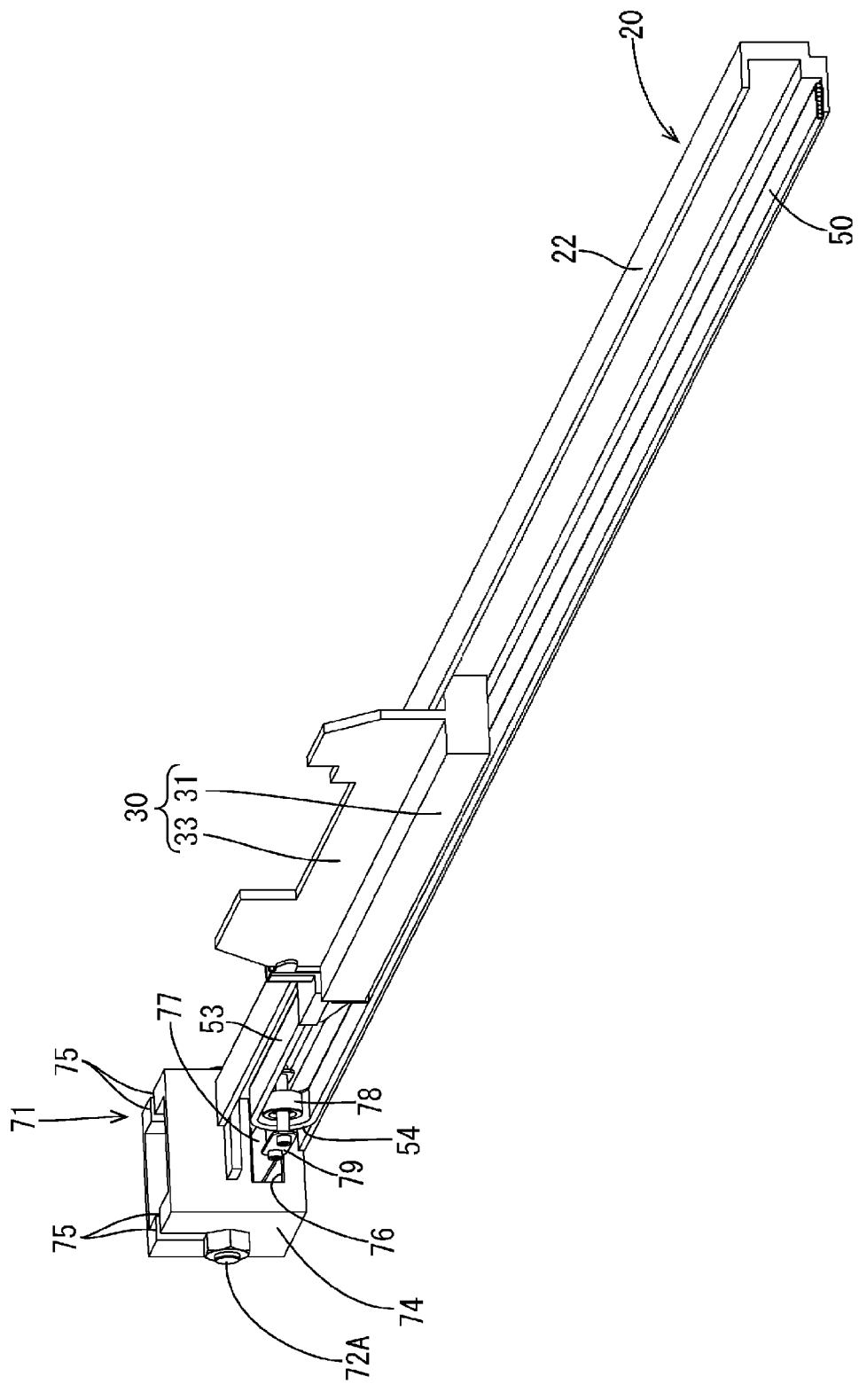
FIG. 12 is a perspective view showing an internal structure of the wire harness routing device.

As shown in FIG. 11, a wire harness routing device 70 of the second embodiment is provided with a roller 78 for applying tension to the excess length portion 53 of the wire harness 50. Since the other configurations are identical to the first embodiment, the same configurations as in the above embodiment are given the same reference signs and further descriptions thereof will be omitted.

A biasing mechanism 71 for elastically biasing the roller 78 is provided at the end portion of the rail 20. The biasing mechanism 71 is provided with a biasing roller 72 that rotates to cause an inner elastic body (not shown) to generate an elastic repulsion force, and a case 74 that rotatably supports a shaft portion of the biasing roller 72.

The case 74 includes a slit portion 75 into which a shaft portion 72A protruding from a central shaft of the biasing roller 72 is inserted and supported, and a communication hole 76 that allows communication between the biasing roller 72 and the insertion hole 21 of the rail 20. The biasing roller 72 accumulates elastic energy by rotation in one direction and generates an elastic repulsion force toward the opposite direction. A band-like portion 77 that extends in a band-like shape and that can bend and deform is wound around the biasing roller 72.

The roller 78 is cylindrically shaped and includes a shaft portion protruding outward from the central shaft, the shaft portion being rotatably supported with a pair of supporting pieces 79. The pair of supporting pieces 79 are fixed to an end portion of the band-like portion 77. Since the roller 78 is pulled toward the biasing roller 72 by the elastic force of the biasing roller 72 via the band-like portion 77, the biasing roller 72 presses the wire harness 50 outward from the inside of the folded portion 54 of the wire harness 50 and applies tension to the wire harness 50 to restrict the bending of the wire harness 50.

Next, operations of the wire harness routing device 70 will be illustrated.

When the seat 60 is slid frontward, the slider 30 slides forward in accordance with the seat 60, the wire harness 50 deforms, and the folded portion 54 and the roller 78 move forward. At this time, since the folded portion 54 is biased outward by the roller 78 biased by an elastic force, the folded portion 54 does not bend, and the folded portion 54 is held in a state where tension is being applied (see FIG. 11). On the other hand, when the seat 60 is slid rearward, the slider 30 slides rearward in accordance with the seat 60, the wire harness 50 deforms, and the biasing roller 72 rotates in the direction in which the band-like portion 77 extends, and the folded portion 54 and the roller 78 move rearward.

According to the second embodiment, since the wire harness 50 is provided with the roller 78 that applies tension to the folded portion of the wire harness 50 in the insertion hole 21, it is possible to suppress bending of the excess length portion 53 of the wire harness 50.

Third Embodiment

Figure 13:
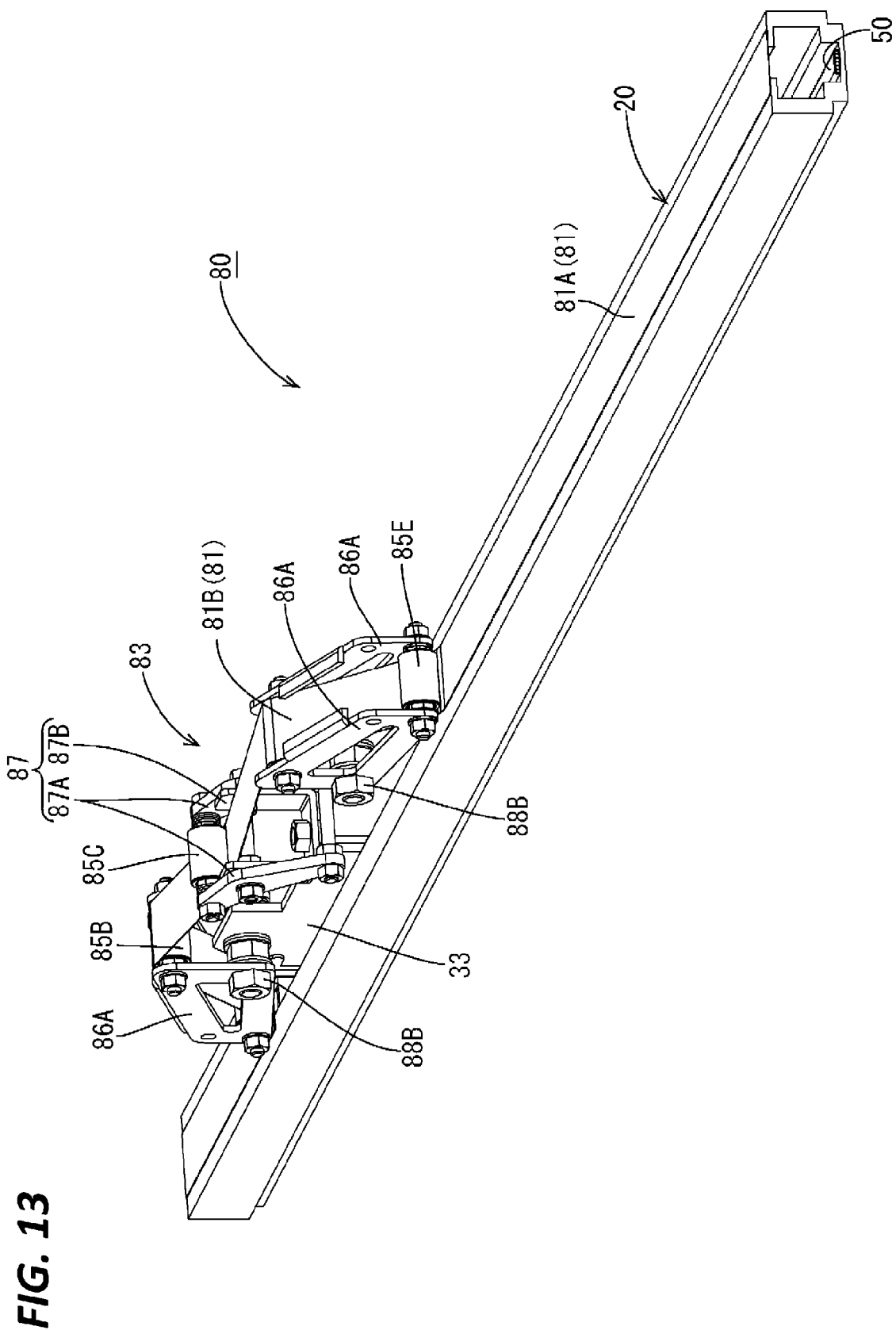
FIG. 13 is a perspective view showing a wire harness routing device according to a third embodiment.
Figure 14:
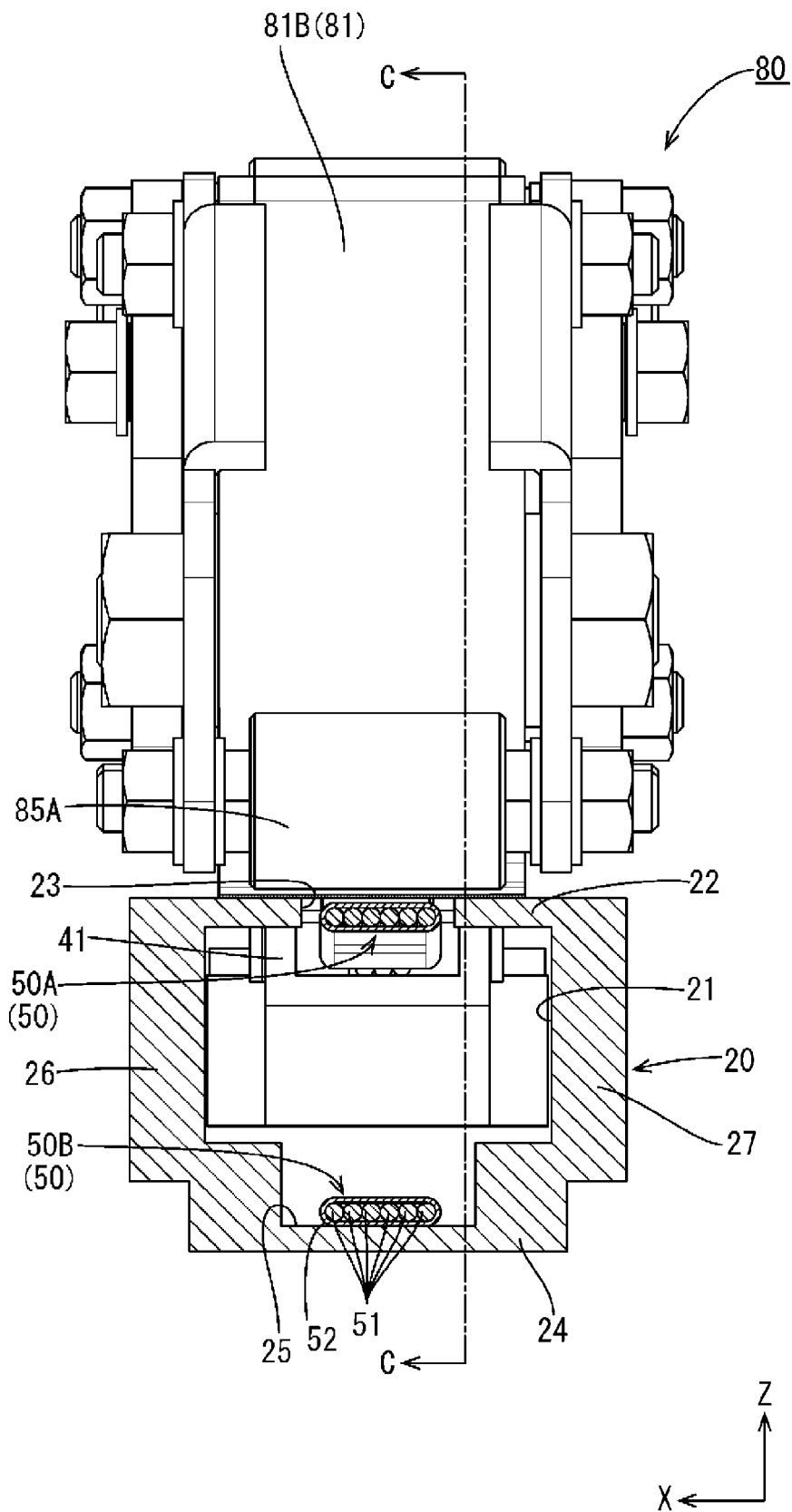
FIG. 14 is a horizontal cross-sectional view showing the wire harness routing device.
Figure 15:
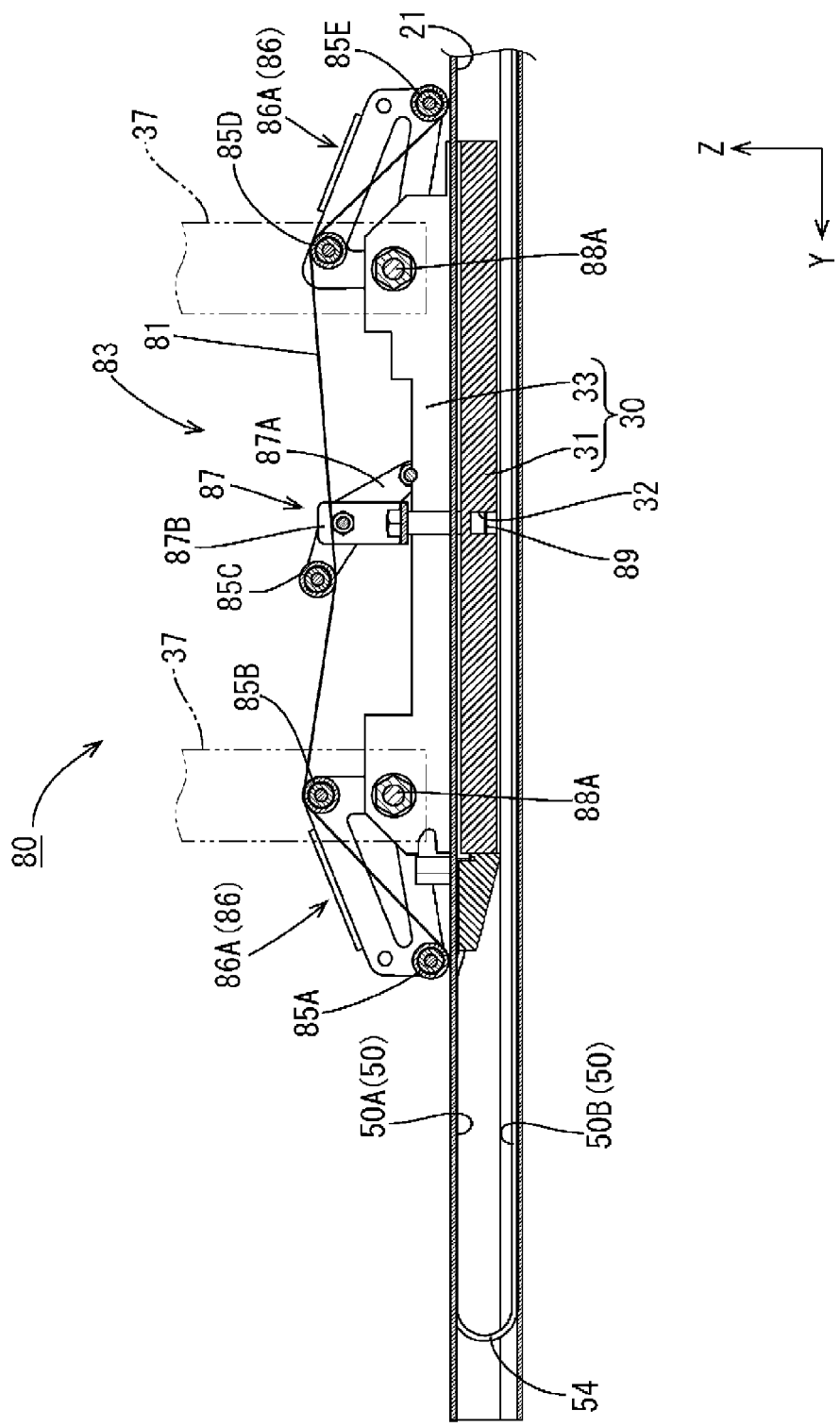
FIG. 15 is a cross-sectional view taken along line C-C in FIG. 14.

Next, a third embodiment will be illustrated with reference to FIGS. 13 to 15. A wire harness routing device 80 of the third embodiment is provided with a cover opening/closing mechanism 83 that can switch a cover 81 for covering the through-groove 23 between a closed state and an open state. In the following descriptions, the same configurations as in the above embodiments are denoted with the same reference signs, and further descriptions thereof will be omitted.

The cover 81 (In FIG. 13, the cover in the closed state is shown as 81A, and the cover in the open state is shown as 81B) is a sheet-like member that can bend and deform, and can be made of, for example, metal such as aluminum and an aluminum alloy, a synthetic resin such as rubber that can elastically deform, or a cloth. The cover 81 extends in a band-like shape in a length corresponding to the length of the rail 20, and has a constant width that is greater than the width of the through-groove 23 and smaller than the width of the upper wall 22. The end portion of the cover 81 in the front-rear direction may also be fixed to the upper surface of the rail 20 with an adhesive agent or the like. As shown in FIG. 15, a through recess 32 for inserting and fastening a fastening member 89 formed by a bolt or a nut is formed in a middle portion of the slider body 31 in the front-rear direction, and the slider 30 is fixed to the cover opening/closing mechanism 83 with the fastening member 89.

(Cover Opening/Closing Mechanism 83)

The cover opening/closing mechanism 83 can rotate in a state in which the cover 81 is pressed, and is provided with five (a plurality of) cover opening/closing rollers 85A to 85E for restricting the direction (path) in which the cover 81 moves, and supporting members 86 and 87 for rotatably supporting the five cover opening/closing rollers 85A to 85E. The cover opening/closing mechanism 83 moves on the rail 20 in accordance with sliding of the seat 60, and switch the state of the cover 81 between the closed state in which the cover 81 closes the through-groove 23 and the open state in which the cover 81 is spaced apart from the through-groove 23 and does not close the through-groove 23.

The cover opening/closing rollers 85A and 85E are rotatably supported by the supporting members 86 on the front side and rear side thereof, respectively, and arranged in close contact with the upper (outer) surface of the cover 81 at a boundary position at which the closed/open state is switched. The supporting member 86 is provided with a left-right pair of quadrangular frame-like members 86A that oppose each other, and shaft portions of the cover opening/closing rollers 85A and 85B are fastened at opposing positions at the corners of the frame-like members 86A with nuts serving as fastening members. The left-right pair of supporting members 86 are linked with a rod-like linking member 88A, and fastened and fixed to the outer surface of member 88A with fastening members 88B such as bolts and nuts. The linking member 88A fixes the supporting members 86 to the slide insertion portion 33 by penetrating the through hole in the slide insertion portion 33. As shown in FIG. 15, the linking member 88A and the supporting members 86 may also fix the cover opening/closing mechanism 83 and the seat 60 by fastening attachment members 37 extending downward underneath the seat 60 to the supporting members 86 with the fastening members such as bolts and nuts.

The supporting member 87 includes a pair of plate-like inclined pieces 87A and a U-shaped fixing member 87B that rotatably supports the inclined pieces 87A. One end of each of the inclined pieces 87A rotatably supports the cover opening/closing roller 85C, and the other end is fixed to the slide insertion portion 33 via an elastic member such as a coil spring.

The cover opening/closing roller 85C presses the cover 81 using the elastic force of the elastic member from the outside. The fixing member 87B is fastened to the through recess 32 of the slider 30 with a fastening member such as a bolt and nut, and thus the bottom surface of the fixing member 87B is fastened and fixed to the slider 30.

With the configuration as described above, when the seat 60 is slid frontward, the cover opening/closing mechanism 83 slides frontward in accordance with the seat 60, the cover 81 in front of the cover opening/closing mechanism 83 in the closed state is switched to the open state, and the cover 81 at the rear end of the cover opening/closing mechanism 83 in the open state is switched to the closed state. On the other hand, when the seat 60 is slid rearward, the cover opening/closing mechanism 83 slides rearward in accordance with the seat 60, the cover 81 behind the cover opening/closing mechanism 83 in the closed state is switched to the open state, and the cover 81 at the front end of the cover opening/closing mechanism 83 in the open state is switched to the closed state.

According to the present embodiment, the following actions and effects will be achieved.

According to the third embodiment, the rail 20 includes the through-groove 23 that allows communication of the insertion hole 21 with the outside, the slider 30 is provided with the slide insertion portion 33 that can be slidably inserted into the through-groove 23, the cover 81 for closing the through-groove 23, and the cover opening/closing mechanism 83 that can switch the cover 81 between the closed state in which the cover 81 closes the through-groove 23 and the open state in which the through-groove 23 is open, in accordance with sliding of the slide insertion portion 33 in the through-groove 23.

In a configuration in which the wire harness 50 is routed in the rail 20, there is a risk that the wire harness 50 will protrude outward from the through-groove 23, foreign objects will intrude from the through-groove 23 into the rail 20, and the like, which may be obstacles for routing the excess length portion 53 of the wire harness 50. According to the above-described embodiment, since the through-groove 23 of the rail 20 is covered with the cover 81, it is possible to suppress the wire harness 50 from protruding from the through-groove 23, and suppress foreign objects from intruding from the through-groove 23 into the rail 20. Here, there is a concern that the cover 81 for covering the through-groove 23 will be an obstacle for sliding of the slide insertion portion 33 for being inserted into the through-groove 23. However, according to the above-described embodiment, the cover opening/closing mechanism 83 makes it possible to switch the cover 81 between the closed state in which the cover 81 closes the through-groove 23 and the open state in which the through-groove 23 is open in accordance with sliding of the slide insertion portion 33 in the through-groove 23, and thus the cover 81 can be suppressed from being an obstacle for sliding of the slide insertion portion 33.

Fourth Embodiment

Figure 16:
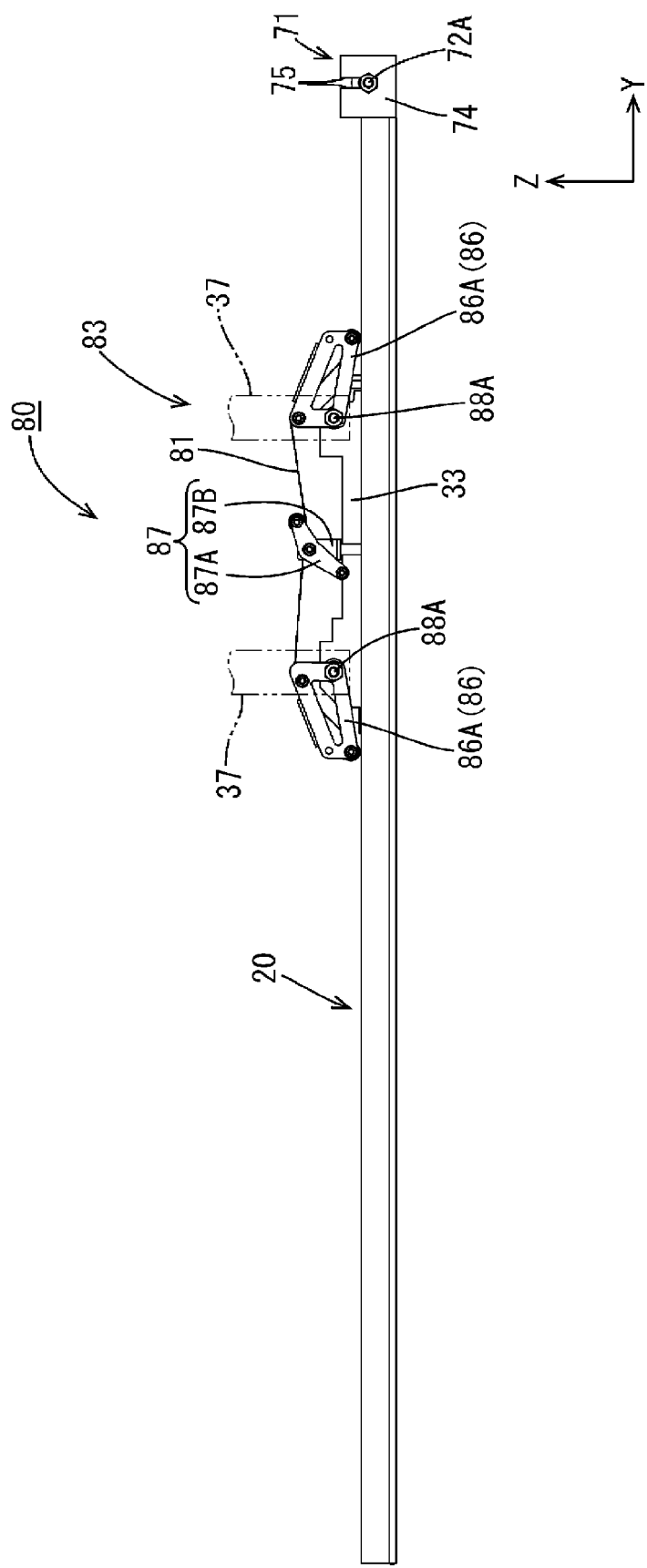
FIG. 16 is a side view showing a wire harness routing device according to a fourth embodiment.
Figure 17:
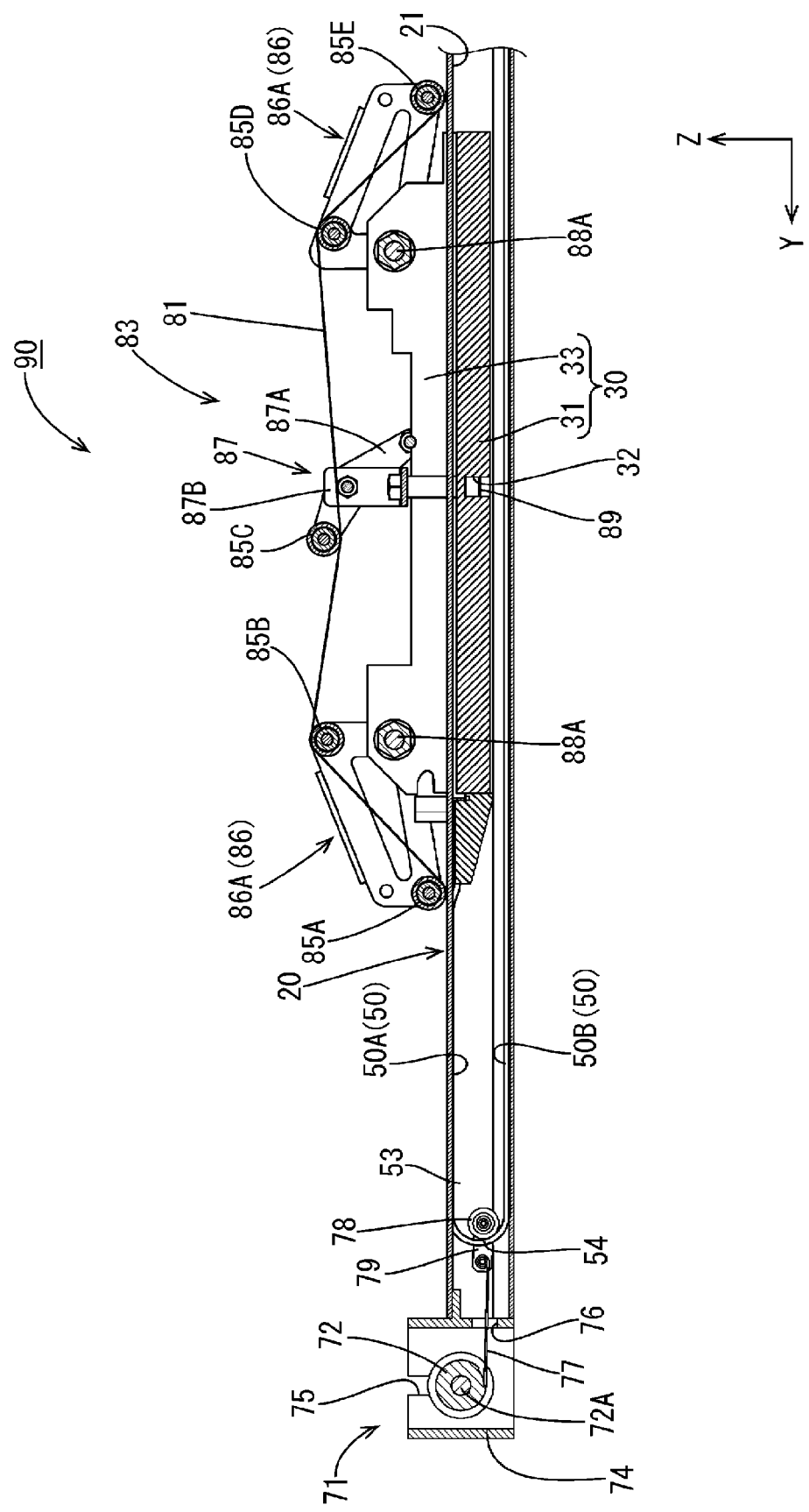
FIG. 17 is a vertical cross-sectional view showing the wire harness routing device.

Next, a fourth embodiment will be illustrated with reference to FIGS. 16 and 17. As shown in FIGS. 16 and 17, a wire harness routing device 90 of the fourth embodiment is the wire harness routing device 70 of the second embodiment provided with the cover opening/closing mechanism 83 of the third embodiment. Other configurations are identical to the above-described embodiments, and further descriptions thereof will be omitted.

Other Embodiments

The technique disclosed in the present specification is not limited to the embodiments disclosed through the description above and the drawings, and for example, the following embodiments are also encompassed in the technical scope of the technique disclosed in the present specification.

(1) Although it was described that the wire harness 50 routed in the insertion hole 21 has a flat shape in which a plurality of wires 51 are arranged side by side in the left-right direction and covered with the sheath 52, there is no limitation to this. The wire harness 50 need not be flat, and a configuration is also possible in which a plurality of exposed wires 51 are bundled together and routed in the insertion hole 21, for example.

(2) Although it was described that the wire harness 50 is routed in the vertical direction in the insertion hole 21, there is no limitation to this. A configuration is also possible in which the wire harness 50 is routed on the left and right sides in the insertion hole 21 and extends along the inner surfaces of the side walls 26 and 27, for example.

(3) Although a configuration was described in which the rail 20 is provided with the harness routing groove 25, a configuration is also possible in which the harness routing groove 25 is not provided.

(4) Although the configuration was described in which the slide insertion portion 33 is fixed to the slidable seat 60, there is no limitation to this. A configuration is also possible in which the slide insertion portion 33 is fixed to a slidable door, for example.

(5) The number of wires 51 included in the wire harness 50 is not limited to the numbers as in the above embodiments, and can be modified to various numbers.

(6) Although the configuration was described in which the wire harness 50 is routed in one of the rails 20 and the wire harness 50 is not routed in the other rail 20, there is no limitation to this. A configuration is also possible in which wire harnesses 50 are routed in both of the pair of rails 20.

(7) The shape of the rail 20 is not limited to the shape as in the above embodiments, and can be modified to various shapes. The shape is not limited to a rectangular tube shape, and the shape may also be a quadrangular tube shape other than a rectangular tube shape, or a polygonal tube shape other than a quadrangular tube shape, for example.

LIST OF REFERENCE NUMERALS 10, 70, 80, 90 Wire harness routing device
20 Rail
21 Insertion hole
23 Through-groove
25 Harness routing groove
30 Slider
31 Slider body
33 Slide insertion portion
40 Protector
41 Harness mounting portion
42 Mounting recess
50 Wire harness
51 Wire
53 Excess length portion
54 Folded portion
60 Seat
71 Biasing mechanism
78 Roller
81 Cover
83 Cover opening/closing mechanism

The invention claimed is:

1. A wire harness routing device comprising:
a rail in which an insertion hole is formed by being surrounded by an upper wall, a lower wall, and side walls of the rail;
a slider that is inserted into the insertion hole and fitted so as to be slidable with respect to an inner wall of the insertion hole in the rail; and
a wire harness that is routed in the insertion hole and moves in accordance with sliding of the slider,
wherein an excess length portion of the wire harness that is generated in accordance with movement of the wire harness deforms in the insertion hole and is held in a state in which it is accommodated in the insertion hole,
the wire harness extends in the insertion hole such that portions thereof oppose each other, and the excess length portion is folded back in the insertion hole, and
a harness routing groove in which the wire harness is routed, linearly extends in a front-rear direction over an entire length of the rail on an upper side of the lower wall.

2. The wire harness routing device according to claim 1, wherein the wire harness includes a plurality of wires, and is formed by arranging the plurality of wires side by side into a flat shape.

3. The wire harness routing device according to claim 1, further comprising:
a roller that applies tension to a portion of the wire harness that is folded back in the insertion hole.

4. A wire harness routing device comprising:
a rail in which an insertion hole is formed;
a slider that is inserted into the insertion hole and slides with respect to the rail; and
a wire harness that is routed in the insertion hole and moves in accordance with sliding of the slider,
wherein an excess length portion of the wire harness that is generated in accordance with movement of the wire harness deforms in the insertion hole and is held in a state in which the excess length portion is accommodated in the insertion hole,
the rail includes a through-groove that allows communication of the insertion hole with an outside of the rail, the slider is provided with a slide insertion portion that is configured to can be slidably inserted into the through-groove, and the wire harness routing device further comprises:

a cover configured to close the through-groove, and a cover driver configured to switch the cover between a closed state in which the cover closes the through-groove and an open state in which the through-groove is open while moving on the rail, in accordance with sliding of the slide insertion portion in the through-groove.

5. The wire harness routing device according to claim 1, further comprising:

a protector fixed to a front end portion of the slider and configured to insert the wire harness, wherein a direction in which the wire harness extends is shifted to a perpendicular direction by the wire harness being inserted into the protector.

6. The wire harness routing device according to claim 1, wherein the cover is a sheet-like member capable of being bent and deformed.

\* \* \* \* \*